US012203046B2

(12) United States Patent
Niiya et al.

(10) Patent No.: US 12,203,046 B2
(45) Date of Patent: Jan. 21, 2025

(54) GREASE COMPOSITION AND ROLLING BEARING

(71) Applicants: JTEKT CORPORATION, Kariya (JP); KYODO YUSHI CO., LTD., Fujisawa (JP)

(72) Inventors: Kanako Niiya, Osaka (JP); Kazunori Miyake, Osaka (JP); Masayuki Murakami, Osaka (JP); Shota Akimoto, Osaka (JP); Takahiro Maeda, Osaka (JP); Kaname Nishi, Osaka (JP); Michitaka Yoshihara, Fujisawa (JP); Kazuki Isa, Fujisawa (JP); Koki Ando, Fujisawa (JP)

(73) Assignees: JTEKT CORPORATION, Kariya (JP); KYODO YUSHI CO., LTD., Fujisawa (JP)

( * ) Notice: Subject to any disclaimer, the term of this patent is extended or adjusted under 35 U.S.C. 154(b) by 0 days.

(21) Appl. No.: 18/014,651

(22) PCT Filed: Jul. 5, 2021

(86) PCT No.: PCT/JP2021/025324
§ 371 (c)(1),
(2) Date: Apr. 4, 2023

(87) PCT Pub. No.: WO2022/009841
PCT Pub. Date: Jan. 13, 2022

(65) Prior Publication Data
US 2023/0272299 A1 Aug. 31, 2023

(30) Foreign Application Priority Data
Jul. 6, 2020 (JP) .............................. 2020-116496

(51) Int. Cl.
*C10M 137/10* (2006.01)
*C10M 125/22* (2006.01)
(Continued)

(52) U.S. Cl.
CPC ........ *C10M 137/10* (2013.01); *C10M 125/22* (2013.01); *C10M 129/26* (2013.01);
(Continued)

(58) Field of Classification Search
CPC ............ C10N 2040/02; C10N 2030/12; C10N 2050/10; C10N 2010/04; C10N 2030/10;
(Continued)

(56) References Cited

U.S. PATENT DOCUMENTS 5,301,923 A  4/1994  Asao et al.
7,265,080 B2  9/2007  Iso et al.
(Continued)

FOREIGN PATENT DOCUMENTS

JP  H10-279981 A  10/1998
JP  2008-239687 A  10/2008
(Continued)

OTHER PUBLICATIONS

Sep. 28, 2021 International Search Report issued in International Patent Application No. PCT/JP2021/025324.
(Continued)

*Primary Examiner* — Vishal V Vasisth
(74) *Attorney, Agent, or Firm* — Oliff PLC

(57) ABSTRACT

The present invention relates to a grease composition including: a base oil; a thickener; a rust inhibitor; and an extreme pressure agent, in which the rust inhibitor includes, with respect to a total mass of the grease composition: 0.10 mass % to 10.00 mass % of a calcium sulfonate; 0.20 mass % to 10.00 mass % of a zinc sulfonate; and 0.10 mass % to 10.00 mass % of a zinc carboxylate, and the extreme pressure
(Continued)

agent includes, with respect to the total mass of the grease composition, 2.00 mass % to 14.00 mass % of a zinc dialkyldithiophosphate.

11 Claims, 1 Drawing Sheet

(51) Int. Cl.
| | |
|---|---|
| *C10M 129/26* | (2006.01) |
| *C10M 133/12* | (2006.01) |
| *C10M 169/06* | (2006.01) |
| C10N 10/04 | (2006.01) |
| C10N 30/08 | (2006.01) |
| C10N 30/10 | (2006.01) |
| C10N 30/12 | (2006.01) |
| C10N 40/02 | (2006.01) |
| C10N 50/10 | (2006.01) |

(52) U.S. Cl.
CPC ........ *C10M 133/12* (2013.01); *C10M 169/06* (2013.01); *C10M 2201/084* (2013.01); *C10M 2207/10* (2013.01); *C10M 2215/06* (2013.01); *C10M 2223/045* (2013.01); *C10N 2010/04* (2013.01); *C10N 2030/08* (2013.01); *C10N 2030/10* (2013.01); *C10N 2030/12* (2013.01); *C10N 2040/02* (2013.01); *C10N 2050/10* (2013.01)

(58) Field of Classification Search
CPC .. C10N 2030/08; F16C 33/66; C10M 141/10; C10M 169/06; C10M 133/12; C10M 125/22; C10M 129/26; C10M 137/10; C10M 2215/06; C10M 2215/1026; C10M 2201/084; C10M 2219/044; C10M 2207/16; C10M 2207/10; C10M 2207/0406; C10M 2223/045

See application file for complete search history.

(56) References Cited

U.S. PATENT DOCUMENTS

| | | | |
|---|---|---|---|
| 2007/0173420 A1 | 7/2007 | Iso | |
| 2010/0087344 A1 | 4/2010 | Saita | |
| 2011/0183876 A1* | 7/2011 | Imai | C10M 169/06 |
| | | | 508/399 |
| 2012/0196781 A1 | 8/2012 | Namiki et al. | |
| 2013/0345101 A1 | 12/2013 | Mai et al. | |
| 2015/0232784 A1 | 8/2015 | Aida et al. | |
| 2015/0330451 A1* | 11/2015 | Inami | F16C 33/6607 |
| | | | 384/462 |
| 2019/0055491 A1* | 2/2019 | Yoshinari | C10M 105/18 |

FOREIGN PATENT DOCUMENTS

| | | |
|---|---|---|
| JP | 2009-185084 A | 8/2009 |
| JP | 2011-084646 A | 4/2011 |
| JP | 2012-012441 A | 1/2012 |
| JP | 2012-193298 A | 10/2012 |
| JP | 2014-084442 A | 5/2014 |

OTHER PUBLICATIONS

Sep. 28, 2021 Written Opinion issued in International Patent Application No. PCT/JP2021/025324.

Jul. 16, 2024 Extended European Search Report issued in European Patent Application No. 21838691.0.

\* cited by examiner

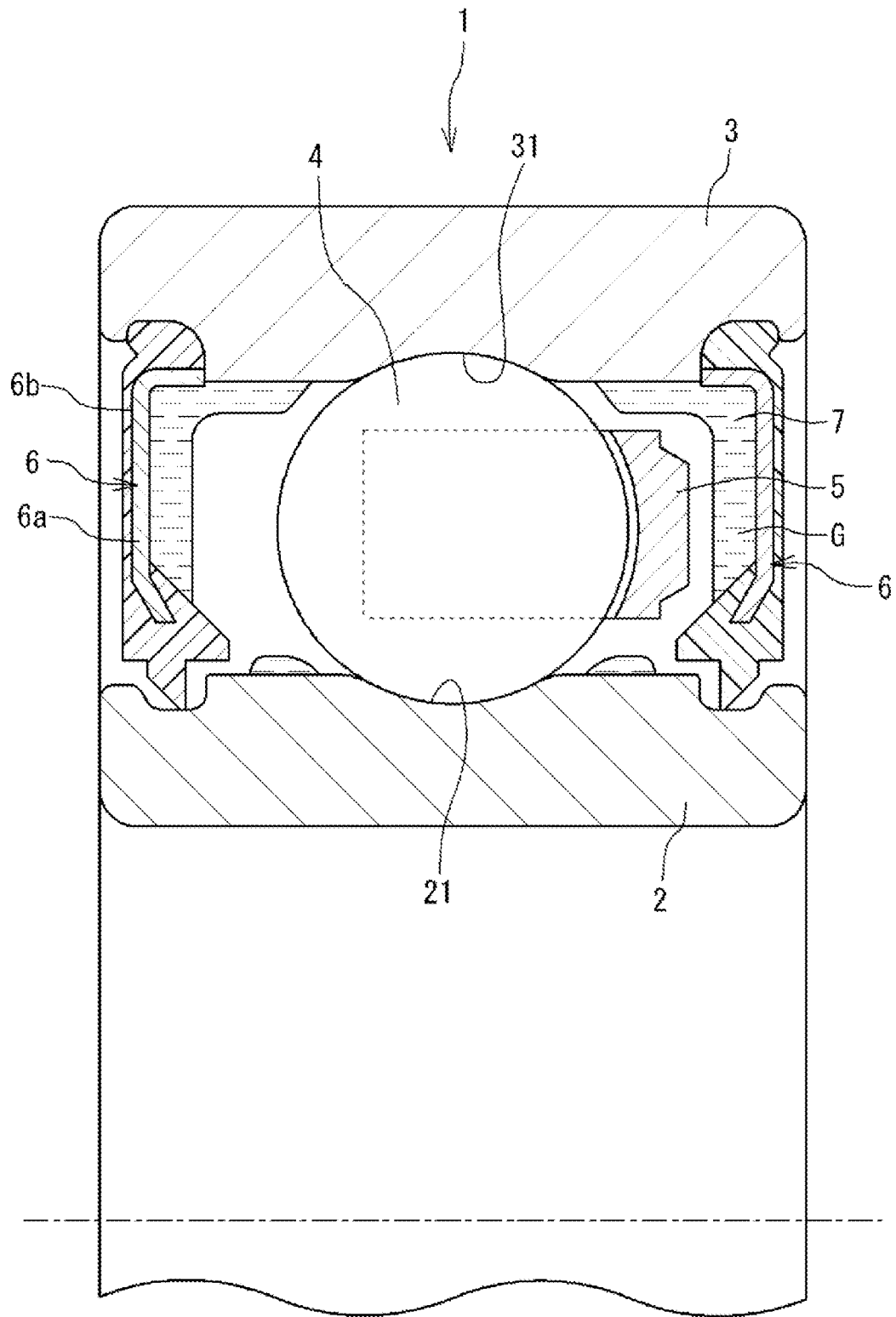

GREASE COMPOSITION AND ROLLING BEARING

This application is a 371 of PCT/JP2021/025324, filed Jul. 5, 2021.

TECHNICAL FIELD

The present invention relates to a grease composition and a rolling bearing in which the grease composition is enclosed.

BACKGROUND ART

Examples of bearings for engine accessories and electrical components of automobiles mainly include bearings for an electromagnetic clutch, bearings for an alternator, and bearings for an idler pulley.

A grease composition used for these bearings is required to have a long bearing lubrication life even under a high temperature environment and to be excellent in white layer flaking resistance.

As a grease composition used for a bearing for an engine accessory or an electrical component of an automobile, for example, Patent Literature 1 proposes a grease composition that includes a base oil containing alkyldiphenyl ethers, a diurea as a thickener, an organic sulfonate rust inhibitor and a load bearing additive as an anti-flaking additive, and an antioxidant.

CITATION LIST

Patent Literature

Patent Literature 1: JP2014-84442A

SUMMARY OF INVENTION

Technical Problem

A bearing for an electromagnetic clutch and a bearing for an idler pulley are bearings used in a wet environment, and the bearings used in a wet environment are also required to have a rust-preventing property in addition to white layer flaking resistance. However, although the grease composition proposed in Patent Literature 1 includes a rust inhibitor, it has been difficult to sufficiently prevent the occurrence of rust in a bearing under a wet environment. Therefore, it is desired to improve the rust-preventing property of the grease composition.

In addition, in the case where the blending amount of the rust inhibitor is increased or a plurality of kinds of rust inhibitors are blended, an improvement in the rust-preventing property of the grease composition can be expected, but in this case, formation of a reaction film derived from an extreme pressure agent is prevented, and as a result, the white layer flaking resistance tends to deteriorate.

That is, at present, it has been difficult to provide a grease composition having both the rust-preventing property and the white layer flaking resistance.

Therefore, there is a demand for a grease composition that can impart an excellent rust-preventing property while preventing the occurrence of white layer flaking.

Solution to Problem

The present inventors have made intensive studies to meet the above requirements, and have found that in the case where a rolling bearing encloses a grease composition including a specific extreme pressure agent for preventing the occurrence of white layer flaking and including three specific kinds of rust inhibitors, the occurrence of white layer flaking in the bearing can be prevented, and an excellent rust-preventing property can be imparted to the bearing. Thus, the present invention has been completed.

The grease composition according to the present invention including:
a base oil;
a thickener;
a rust inhibitor; and
an extreme pressure agent,
in which the rust inhibitor includes, with respect to a total mass of the grease composition:
0.10 mass % to 10.00 mass % of a calcium sulfonate;
0.20 mass % to 10.00 mass % of a zinc sulfonate; and
0.10 mass % to 10.00 mass % of a zinc carboxylate, and
the extreme pressure agent includes, with respect to the total mass of the grease composition,
2.00 mass % to 14.00 mass % of a zinc dialkyldithiophosphate.

Since the grease composition according to the present invention includes a predetermined amount of a zinc dialkyldithiophosphate as the extreme pressure agent, a reaction film including the zinc dialkyldithiophosphate is formed, and the occurrence of white layer flaking in the rolling bearing can be prevented when the grease composition is used for a rolling bearing.

In addition, since the grease composition includes predetermined amounts of a calcium sulfonate, a zinc sulfonate, and a zinc carboxylate as the rust inhibitors, the occurrence of rust can be prevented without inhibiting the white layer flaking resistance in the rolling bearing in which the grease composition is enclosed.

In the grease composition, a content of the calcium sulfonate is preferably 0.30 mass % to 4.00 mass % with respect to the total mass of the grease composition.

In the grease composition, a total content of the rust inhibitor and the extreme pressure agent is preferably 15.00 mass % or less with respect to the total mass of the grease composition.

The grease composition further preferably includes an antioxidant, and the antioxidant includes 0.50 mass % to 5.00 mass % of naphthylamine with respect to the total mass of the grease composition.

The rolling bearing according to the present invention is a rolling bearing in which the grease composition according to the present invention is enclosed.

Advantageous Effects of Invention

When the grease composition according to the present invention is used for a rolling bearing, the grease composition can prevent the occurrence of white layer flaking in the rolling bearing, and impart an excellent rust-preventing property to the rolling bearing.

The rolling bearing according to the present invention is a rolling bearing less likely to occur white layer flaking and rust since the rolling bearing encloses the above grease composition.

BRIEF DESCRIPTION OF DRAWINGS

The FIGURE is a cross-sectional view showing a ball bearing according to an embodiment of the present invention.

DESCRIPTION OF EMBODIMENTS

Hereinafter, an embodiment of the present invention will be described with reference to the drawing.

A rolling bearing according to an embodiment of the present invention is a ball bearing in which a grease including the grease composition according to an embodiment of the present invention is enclosed.

The FIGURE is a cross-sectional view showing a ball bearing according to an embodiment of the present invention.

A ball bearing 1 includes an inner ring 2, an outer ring 3 provided at a radially outer side of the inner ring 2, balls 4 as a plurality of rolling elements provided between the inner ring 2 and the outer ring 3, and an annular cage 5 for holding these balls 4. In addition, the ball bearing 1 is provided with seals 6 on one side and the other side in an axial direction.

Further, an annular region 7 between the inner ring 2 and the outer ring 3 encloses a grease G including the grease composition according to the embodiment of the present invention.

The inner ring 2 has, on an outer circumference thereof, an inner raceway surface 21 on which the balls 4 roll.

The outer ring 3 has, on an inner circumference thereof, an outer raceway surface 31 on which the balls 4 roll.

A plurality of balls 4 are interposed between the inner raceway surface 21 and the outer raceway surface 31 and roll on the inner raceway surface 21 and the outer raceway surface 31.

The grease G enclosed in the region 7 is interposed at contact points between the balls 4 and the inner raceway surface 21 of the inner ring 2 and at contact points between the balls 4 and the outer raceway surface 31 of the outer ring 3. The grease G is enclosed in a manner of occupying 20 vol % to 40 vol % of a volume of a space surrounded by the inner ring 2, the outer ring 3, and the seals 6 excluding the balls 4 and the cage 5.

Each of the seals 6 is an annular member including an annular metal ring 6a and an elastic member 6b fixed to the metal ring 6a. A radially outer portion of the seal 6 is fixed to the outer ring 3, and a lip tip of a radially inner portion of the seal 6 is attached to the inner ring 2 so as to be slidable. The seals 6 prevent the enclosed grease G from leaking to the outside.

The ball bearing 1 configured as described above encloses, as the grease G, a grease including the grease composition according to the embodiment of the present invention, which will be described later. Therefore, in the ball bearing 1 in which the grease G is enclosed, the white layer flaking is less likely to occur, and the rust is less likely to occur.

Next, a grease composition constituting the grease G will be described in detail.

The grease composition constituting the grease G is the grease composition according to the embodiment of the present invention, and includes a base oil, a thickener, a rust inhibitor, and an extreme pressure agent.

Since the grease composition includes the specific extreme pressure agent, the occurrence of white layer flaking can be prevented, and since the grease composition includes three specific kinds of rust inhibitors, the occurrence of rust in the rolling bearing can be avoided. That is, according to the above grease composition, both the white layer flaking resistance and the rust-preventing property can be achieved.

In a rolling bearing in which a grease composition is enclosed, in order to prevent the occurrence of white layer flaking, it is important to reliably form a reaction film formed by an extreme pressure agent on raceway surfaces of the inner ring and the outer ring during rotation of the bearing. On the other hand, in order to prevent the occurrence of rust, it is important to form a dense adsorption film formed by a rust inhibitor on the surfaces of the inner ring and the outer ring and the surfaces of the rolling elements during non-rotation of the bearing, such as during storage or stop.

Here, in the case where the adhesion of the adsorption film formed by the rust inhibitor to the surfaces of the inner ring and the outer ring and the surfaces of the rolling elements is too high, the adsorption film is maintained even during rotation of the bearing, and the formation of the reaction film derived from the extreme pressure agent on the raceway surfaces of the inner ring and the outer ring may be inhibited. In this case, the white layer flaking resistance becomes insufficient.

In contrast, an adsorption film formed by the three specific kinds of rust inhibitors included in the grease composition according to the present embodiment has weaker adhesion to the surfaces of the inner ring and the outer ring and the surfaces of the rolling elements than in the case of using only one kind of rust inhibitor, and the adsorption film is hardly maintained during the rotation of the bearing. Therefore, it is considered that the adsorption film formed by the three kinds of rust inhibitors does not inhibit the formation of the reaction film derived from the extreme pressure agent during the rotation of the bearing.

This is considered to be the reason why the grease composition according to the embodiment of the present invention can prevent the occurrence of white layer flaking in the rolling bearing and can impart an excellent rust-preventing property to the rolling bearing.

Examples of the base oil include ether oils such as alkyldiphenyl ethers (ADE), ester oils, poly-α-olefin (PAO), polyalkylene glycols, fluorine oils, and silicone oils.

Among them, alkyldiphenyl ethers (ADE) are preferred. This is because alkyldiphenyl ether is suitable for providing a grease composition having excellent white layer flaking resistance.

As the alkyldiphenyl ethers, a known alkyldiphenyl ether according to the related art used as a base oil for a grease for rolling bearings can be used.

In the case where the base oil is an alkyldiphenyl ether, the base oil kinematic viscosity at 40° C. of the alkyldiphenyl ether is preferably 60 mm$^2$/s to 200 mm$^2$/s. This is because, in this case, the grease composition is suitable for use at a high temperature.

On the other hand, in the case where the base oil kinematic viscosity (40° C.) is less than 60 mm$^2$/s, seizure may occur at a high temperature when the grease composition is used. In the case where the base oil kinematic viscosity (40° C.) exceeds 200 mm$^2$/s, the starting torque at low temperature may increase when the grease composition is used.

The base oil kinematic viscosity (40° C.) is more preferably 80 mm$^2$/s to 120 mm$^2$/s.

The above base oil kinematic viscosity is a value in accordance with JIS K 2283:2000.

As the thickener, a known thickener according to the related art can be used. The thickener is preferably a diurea.

The diurea is preferably the diurea represented by the following formula (1).

$$R^1\text{—NHCONH—}R^2\text{—NHCONH—}R^3. \qquad (1)$$

(In the formula (1), $R^1$ and $R^3$ each independently represent an alkyl group represented by —$C_nH_{2n+1}$ (n is an integer of 8 to 18), or an alicyclic group represented by $R^4$—$C_6H_{10}$— ($R^4$ represents hydrogen, a 2-methyl group, a 3-methyl group, or a 4-methyl group), and $R^2$ represents —$(CH_2)_6$—, —$C_6H_3(CH_3)$—, or —$C_6H_4$—$CH_2$—$C_6H_4$—.)

In the formula (1), in the case where $R^2$ represents —$C_6H_3(CH_3)$—, the phenylene group is preferably bonded to an urea group at 2-, 4-positions or 2-, 6-positions with the methyl group as the 1-position. In the case where $R^2$ represents —$C_6H_4$—$CH_2$—$C_6H_4$—, in each of the phenylene groups, the urea group is preferably bonded to the para-position relative to the methylene group.

In addition, $R^1$ and $R^3$ preferably represent —$C_{18}H_{37}$ and —$C_6H_{11}$ (cyclohexyl group). $R^2$ preferably represents —$C_6H_4$—$CH_2$—$C_6H_4$—.

The above thickener may be constituted by one kind of diurea, and is preferably a mixture of two or more kinds of diureas.

In the case where the thickener is a mixture of two or more kinds of diureas, the mixture is preferably
- a mixture of an aliphatic diurea in which both $R^1$ and $R^3$ in the formula (1) represent the alkyl group and an alicyclic diurea in which both $R^1$ and $R^3$ in the formula (1) represent the alicyclic group, or
- a mixture of an alicyclic aliphatic diurea in which one of $R^1$ and $R^3$ in the formula (1) represents the alkyl group and the other represents the alicyclic group, and an aliphatic diurea in which both $R^1$ and $R^3$ in the formula (1) represent the alkyl group and/or an alicyclic diurea in which both $R^1$ and $R^3$ in the formula (1) represent the alicyclic group.

This is because diureas in which an alkyl group and an alicyclic group are mixed as the functional groups represented by $R^1$ and $R^3$ are suitable as a thickener of a grease composition that can achieve both seizure resistance and leakage resistance at a high level.

The diurea represented by the formula (1) is a product produced by a reaction between an amine compound and a diisocyanate compound.

The amine compound is an aliphatic amine and/or an alicyclic amine.

The aliphatic amine is an aliphatic amine having 8 to 18 carbon atoms, and specific examples thereof include octylamine, nonylamine, decylamine, undecylamine, dodecylamine, tetradecylamine, hexadecylamine, octadecylamine, and oleylamine.

As the alicyclic amine, cyclohexylamine, 1-amino-2-methylcyclohexane, 1-amino-3-methylcyclohexane, and 1-amino-4-methylcyclohexane can be selected.

As the diisocyanate compound, hexamethylene diisocyanate (HDI), 2,4-toluene diisocyanate (2,4-TDI), 2,6-toluene diisocyanate (2,6-TDI), a mixture of 2,4-TDI and 2,6-TDI, and 4,4'-diphenylmethane diisocyanate (MDI) can be selected.

In order to obtain the diurea represented by the formula (1), the amine compound and the diisocyanate compound can react under various conditions, and the amine compound and the diisocyanate compound preferably react in the base oil from the point that a diurea compound having high uniform dispersibility as a thickener can be obtained.

The reaction between the amine compound and the diisocyanate compound may be carried out by adding a base oil in which the diisocyanate compound is dissolved to a base oil in which the amine compound is dissolved, or may be carried out by adding a base oil in which the amine compound is dissolved to a base oil in which the diisocyanate compound is dissolved.

The temperature and time in the reaction between the amine compound and the diisocyanate compound are not particularly limited, and the same conditions as those usually employed in this kind of reaction may be employed.

The reaction temperature is preferably 25° C. to 110° C.

The reaction time is preferably 0.5 hours to 2.0 hours from the viewpoint of completing the reaction between the amine compound and the diisocyanate compound and from the viewpoint of efficiently producing a grease by shortening the production time.

The content of the thickener is preferably 5.00 mass % to 30.00 mass % with respect to the total mass of the grease composition.

In the case where the content of the thickener is too small, grease leakage may occur during use, and in the case where the content is too large, seizure may occur during use of the grease composition.

A more preferred content of the thickener is 10.00 mass % to 20.00 mass % with respect to the total mass of the grease composition.

One of the technical features of the grease composition is that the grease composition includes three specific kinds of rust inhibitors.

Examples of the rust inhibitor include calcium sulfonates, zinc sulfonates, and zinc carboxylates.

The calcium sulfonate is not particularly limited as long as it can be blended in a grease composition and used as a rust inhibitor.

Specific examples of the calcium sulfonate include calcium sulfonates represented by the following formula (2).

$$[R^5—SO_3]_2Ca \qquad (2)$$

(In the formula (2), $R^5$ represents an alkyl group, an alkenyl group, an alkylnaphthyl group, a dialkylnaphthyl group, an alkylphenyl group, or a petroleum high-boiling fraction, and both the alkyl group and the alkenyl group are linear or branched and have 2 to 22 carbon atoms.)

$R^5$ preferably represents an alkylphenyl group in which the number of carbon atoms in the alkyl group in $R^5$ is preferably 6 to 18, more preferably 8 to 18, and particularly preferably 10 to 18. Among the compounds represented by the formula (2), an overbased calcium sulfonate having a base number (in accordance with JIS K 2501: 2003) of preferably 50 mgKOH/g to 500 mgKOH/g, and more preferably 300 mgKOH/g to 500 mgKOH/g is used. The overbased calcium sulfonate includes calcium sulfonate and calcium carbonate.

The content of the calcium sulfonate is 0.10 mass % to 10.00 mass % with respect to the total mass of the grease composition. In the case where the content of the calcium sulfonate is out of this range, it is difficult to achieve both the rust-preventing property and the white layer flaking resistance even when three specific kinds of rust inhibitors are used in combination.

The content of the calcium sulfonate is preferably 0.30 mass % to 4.00 mass % with respect to the total mass of the grease composition. In this case, the grease composition can more preferably achieve both the rust-preventing property and the white layer flaking resistance.

The zinc sulfonate is not particularly limited as long as it can be blended in a grease composition and used as a rust inhibitor.

Specific examples of the zinc sulfonate include zinc sulfonates represented by the following formula (3).

$$[R^6—SO_3]_2Zn \qquad (3)$$

(In the formula (3), $R^6$ represents an alkyl group, an alkenyl group, an alkylnaphthyl group, a dialkylnaphthyl group, or an alkylphenyl group, and both the alkyl group and the alkenyl group are linear or branched, and have 2 to 22 carbon atoms.)

The zinc sulfonate is preferably zinc alkylnaphthalenesulfonate.

The content of the zinc sulfonate is 0.20 mass % to 10.00 mass % with respect to the total mass of the grease composition. In the case where the content of the zinc sulfonate is out of this range, it is difficult to achieve both the rust-preventing property and the white layer flaking resistance even when the three specific kinds of rust inhibitors are used in combination.

The content of the zinc sulfonate is preferably 0.50 mass % to 3.00 mass % with respect to the total mass of the grease composition. In this case, the grease composition is more suitable for achieving both the rust-preventing property and the white layer flaking resistance.

The zinc carboxylate is not particularly limited as long as it can be blended in the grease composition and used as a rust inhibitor.

Specific examples of the zinc carboxylate include zinc naphthenate, zinc rosinate, zinc neodecanoate, zinc octylate, zinc stearate, and zinc laurate.

The zinc carboxylate is preferably zinc naphthenate.

The content of the zinc carboxylate is 0.10 mass % to 10.00 mass % with respect to the total mass of the grease composition. In the case where the content of the zinc carboxylate is out of this range, it is difficult to achieve both the rust-preventing property and the white layer flaking resistance even when the three specific kinds of rust inhibitors are used in combination.

The content of the zinc carboxylate is preferably 0.10 mass % to 1.00 mass % with respect to the total mass of the grease composition. In this case, the grease composition is more suitable for achieving both the rust-preventing property and the white layer flaking resistance.

An upper limit of the total content of the rust inhibitor is preferably 15.00 mass % with respect to the total mass of the grease composition. In the case where the total content of the rust inhibitor is more than 15.00 mass %, the formation of a reaction film that prevents white layer flaking may be inhibited.

The extreme pressure agent is a zinc dialkyldithiophosphate (hereinafter also referred to as ZnDTP).

As the ZnDTP, a known ZnDTP according to the related art may be used.

Specific examples of the ZnDTP include a compound represented by the following formula (4).

[Chem. 1]

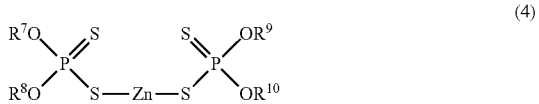

(4)

(In the formula (4), $R^7$ to $R^{10}$ each independently represent any one of a primary alkyl group, a secondary alkyl group, and an aryl group.)

As the ZnDTP, it is preferable to use only one kind of ZnDTP in which $R^7$ to $R^{10}$ in the formula (4) each independently represent a primary alkyl group or a secondary alkyl group having 3 to 8 carbon atoms, or to use a plurality of kinds of ZnDTPs having different carbon atoms in combination.

The content of the extreme pressure agent is 2.00 mass % to 14.00 mass % with respect to the total mass of the grease composition.

In the case where the content of the extreme pressure agent is less than 2.00 mass %, sufficient white layer flaking resistance may not be ensured. On the other hand, even in the case where the content of the extreme pressure agent exceeds 14.00 mass %, a remarkable improvement in the white layer flaking resistance is not recognized as compared with the case where the content of the extreme pressure agent is 14.00 mass %.

In the grease composition, the total content of the rust inhibitor and the extreme pressure agent is preferably 15.00 mass % or less with respect to the total mass of the grease composition.

The grease composition preferably further includes an antioxidant.

The antioxidant is not particularly limited, and a known antioxidant according to the related art may be used.

The antioxidant is preferably an amine-based antioxidant, and more preferably naphthylamine. The grease composition using naphthylamine as the antioxidant has particularly good seizure resistance at a high temperature.

Specific examples of the naphthylamine include 1-naphthylamine, phenyl-1-naphthylamine, N-naphthyl-(1,1,3,3-tetramethylbutylphenyl)-1-amine, alkylphenyl-1-naphthylamine, p-octylphenyl-1-naphthylamine, p-nonylphenyl-1-naphthylamine, p-dodecylphenyl-1-naphthylamine, phenyl-2-naphthylamine, and N-[4-(1,1,3,3-tetramethylbutyl)phenyl]-1-naphthylamine.

The content of the antioxidant is preferably 0.50 mass % to 5.00 mass % with respect to the total mass of the grease composition.

In the case where the content of the antioxidant is less than 0.50 mass %, the effect of blending the antioxidant may not be sufficiently obtained. On the other hand, even in the case where the content of the antioxidant exceeds 5.00 mass %, a remarkable improvement in the heat resistance is not recognized as compared with the case where the content of the antioxidant is 5.00 mass %.

The grease composition may further include an appropriate amount of additives such as an antiwear agent, a dye, a hue stabilizer, a thickener, a structure stabilizer, a metal deactivator, and a viscosity index improver as long as the effects of the present invention are not impaired.

The grease composition according to the present invention can be used at a point where grease lubrication is required, and is preferably used as a grease for rolling bearings. In particular, the grease composition according to the present invention is suitable as a grease for a rolling bearing, which is required to have both the white layer flaking resistance and the rust-preventing property.

Therefore, the grease including the grease composition is preferably used as a grease enclosed in a rolling bearing used in a wet environment, such as a bearing for an electromagnetic clutch and a bearing for an idler pulley.

Next, a method for producing the grease composition will be described.

The grease composition can be produced, for example, by first preparing a mixture of a base oil and a thickener, then adding the predetermined rust inhibitor, an extreme pressure agent, and various additives such as an antioxidant to be included as necessary to the obtained mixture, and stirring the resultant with a three-roll mill to disperse the components.

The present invention is not limited to the embodiment described above, and can also be implemented in other embodiments.

The rolling bearing according to the embodiment of the present invention is not limited to a ball bearing in which the grease composition according to the embodiment of the present invention is enclosed. The rolling bearing may be a needle bearing, a roller bearing, or other rolling bearings using parts other than balls as rolling elements, as long as the grease composition according to the embodiment of the present invention is enclosed therein.

EXAMPLES

Next, the present invention will be described in more detail based on Examples, but the present invention is not limited only to these Examples.

Here, a plurality of grease compositions was prepared and properties of each grease composition were evaluated. The composition and evaluation results of each grease composition were shown in Table 1.

The following raw materials were used in Examples/Comparative Examples.

[Base Grease Material]
  Diisocyanate compound: 4,4'-diphenylmethane diisocyanate
  Amine compound A (alicyclic amine): cyclohexylamine
  Amine compound B (aliphatic amine): octadecylamine
  Base oil: ADE (base oil kinematic viscosity at 40° C.=103 mm$^2$/s)

[Additives]
  Rust inhibitor A (calcium sulfonate): product name BRYTON C-400C (manufactured by CHEMTURA CORPORATION, a product containing 26 mass % of calcium sulfonate as an active ingredient is used) Rust inhibitor B (zinc sulfonate): product name NA-SUL ZS-HT (manufactured by
  KING INDUSTRIES, a product containing 35 mass % of zinc sulfonate as an active ingredient is used)
  Rust inhibitor C (zinc carboxylate): product name DAILUBE Z-310 (manufactured by DIC Corporation, a product containing 20 mass % of zinc naphthenate as an active ingredient is used)
  Extreme pressure agent A (zinc dialkyldithiophosphate): product name LUBRIZOL 1395 (manufactured by Lubrizol Japan Ltd., a product containing 84 mass % of zinc as an active ingredient is used)
  Extreme pressure agent B (zinc dialkyldithiophosphate): product name LUBRIZOL 677A (manufactured by Lubrizol Japan Ltd., a product containing 93 mass % of zinc dialkyldithiophosphate as an active ingredient is used)
    Antioxidant (naphthylamine): product name IRGANOX L06 (manufactured by BASF Japan Ltd., a product containing 100 mass % of N-[4-(1,1,3,3-tetramethylbutyl)phenyl]-1-naphthylamine as an active ingredient)
(Production of Base Grease)
  (1) An amine compound (alicyclic amine: aliphatic amine=5:1) as a raw material of a thickener was mixed with ADE in half the amount of ADE prepared to have a base oil content of 77.00 mass % so as to have a thickener content of 23.00 mass %, and the mixture was heated to 70° C. to 80° C. and dissolved, thereby preparing a solution A.
  (2) Separately from the preparation of the solution A, a diisocyanate compound as a raw material of a thickener was mixed with ADE in half the amount of ADE prepared to have a base oil content of 77.00 mass % so as to have a thickener content of 23.00 mass %, and the mixture was heated to 70° C. to 80° C. and dissolved, thereby preparing a solution B.
  (3) The solution A was gradually added to the solution B while stirring the solution B. After addition, the mixed solution was held at 100° C. to 110° C. for 30 minutes. Thereafter, the temperature was raised to 160° C. to 180° C., and then cooled to prepare a base grease. In the base grease, the content of the base oil is 77.00 mass %, and the content of the thickener is 23.00 mass %.

The worked penetration (60W) of the base grease was measured by a method in accordance with JIS K 2220: 2013-7. The worked penetration of the base grease was No. 5 in NLGI penetration grade.

Example 1

To the base grease, ADE (69.70 mass % together with the base oil of the base grease), BRYTON C-400C (2.00 mass %), NA-SUL ZS-HT (4.00 mass %), DAILUBE Z-310 (0.80 mass %), LUBRIZOL 1395 (4.00 mass %), LUBRIZOL 677A (2.00 mass %), and IRGANOX L06 (2.00 mass %) were added so as to have the contents shown in Table 1, followed by mixing the mixture using a mixer, and then, dispersion was performed with a three-roll mill to obtain a grease composition.

Example 2

A grease composition was prepared in the same manner as in Example 1, except that the addition amounts of ADE (72.70 mass % together with the base oil of the base grease), LUBRIZOL 1395 (2.00 mass %), and LUBRIZOL 677A (1.00 mass %) were changed to contents shown in Table 1.

Example 3

A grease composition was prepared in the same manner as in Example 1, except that the addition amounts of ADE (68.50 mass % together with the base oil of the base grease), BRYTON C-400C (5.00 mass %), NA-SUL ZS-HT (3.00 mass %), DAILUBE Z-310 (3.00 mass %), LUBRIZOL 1395 (2.00 mass %), and LUBRIZOL 677A (1.00 mass %) were changed to contents shown in Table 1.

Example 4

A grease composition was prepared in the same manner as in Example 3, except that the addition amounts of ADE (66.50 mass % together with the base oil of the base grease) and NA-SUL ZS-HT (5.00 mass %) were changed to contents shown in Table 1.

Comparative Example 1

A grease composition was prepared in the same manner as in Example 1, except that the addition amounts of ADE (78.70 mass % together with the base oil of the base grease), BRYTON C-400C (not blended), NA-SUL ZS-HT (1.00 mass %), LUBRIZOL 1395 (1.33 mass %), and LUBRIZOL 677A (0.67 mass %) were changed to contents shown in Table 1.

Comparative Example 2

A grease composition was prepared in the same manner as in Comparative Example 1, except that the addition amounts of ADE (77.70 mass % together with the base oil of the base grease), BRYTON C-400C (2.00 mass %), and NA-SUL ZS-HT (not blended) were changed to contents shown in Table 1.

Comparative Example 3

A grease composition was prepared in the same manner as in Comparative Example 1, except that the addition amounts of ADE (78.50 mass % together with the base oil of the base grease), BRYTON C-400C (1.00 mass %), and DAILUBE Z-310 (not blended) were changed to contents shown in Table 1.

Comparative Example 4

A grease composition was prepared in the same manner as in Comparative Example 1, except that the addition amounts of ADE (74.70 mass % together with the base oil of the base grease), LUBRIZOL 1395 (4.00 mass %), and LUBRIZOL 677A (2.00 mass %) were changed to contents shown in Table 1.

Comparative Example 5

A grease composition was prepared in the same manner as in Comparative Example 2, except that the addition amounts of ADE (74.70 mass % together with the base oil of the base grease), BRYTON C-400C (1.00 mass %), LUBRIZOL 1395 (4.00 mass %), and LUBRIZOL 677A (2.00 mass %) were changed to contents shown in Table 1.

Comparative Example 6

A grease composition was prepared in the same manner as in Comparative Example 3, except that the addition amounts of ADE (74.50 mass % together with the base oil of the base grease), LUBRIZOL 1395 (4.00 mass %), and LUBRIZOL 677A (2.00 mass %) were changed to contents shown in Table 1.

Comparative Example 7

A grease composition was prepared in the same manner as in Comparative Example 2, except that the addition amounts of ADE (77.50 mass % together with the base oil of the base grease), DAILUBE Z-310 (not blended), LUBRIZOL 1395 (2.00 mass %), and LUBRIZOL 677A (1.00 mass %) were changed to contents shown in Table 1.

Comparative Example 8

A grease composition was prepared in the same manner as in Comparative Example 1, except that the addition amounts of ADE (76.70 mass % together with the base oil of the base grease) and BRYTON C-400C (2.00 mass %) were changed to contents shown in Table 1.

(Evaluation for Grease Composition)

The grease compositions prepared in Examples 1 to 4 and Comparative Examples 1 to 8 were evaluated. The worked penetration of the grease compositions prepared in Examples 1 to 4 and Comparative Examples 1 to 8 was No. 2 to No. 3 in NLGI penetration grade. The results were shown in Table 1.

TABLE 1

| | | | | Examples | | | |
|---|---|---|---|---|---|---|---|
| | Items | Unit | 1 | 2 | 3 | 4 |
| Thickener | Diurea (alicyclic diyrea: aliphatic diurea = 5:1) | Mass % | | 15.50 | | |
| Base oil | ADE | Mass % | 69.70 | 72.70 | 68.50 | 66.50 |
| Additives | Product name BRYTON C-400C | Mass % | 2.00 | 2.00 | 5.00 | 5.00 |
| | Active ingredient amount calcium sulfonate (rust inhibitor A) | Mass % | 0.52 | 0.52 | 1.30 | 1.30 |
| | Product name NA-SUL ZS-HT | Mass % | 4.00 | 4.00 | 3.00 | 5.00 |
| | Active ingredient amount zinc sulfonate (rust inhibitor B) | Mass % | 1.40 | 1.40 | 1.05 | 1.75 |
| | Product name DAILUBE Z-310 | Mass % | 0.80 | 0.80 | 3.00 | 3.00 |
| | Active ingredient amount zinc carboxylate (rust inhibitor C) | Mass % | 0.16 | 0.16 | 0.60 | 0.60 |
| | Product name LUBRIZOL 1395 | Mass % | 4.00 | 2.00 | 2.00 | 2.00 |
| | Product name LUBRIZOL 677A | Mass % | 2.00 | 1.00 | 1.00 | 1.00 |
| | Active ingredient amount ZnDTP (extreme pressure agent) | Mass % | 5.22 | 2.61 | 2.61 | 2.61 |
| | Product name IRGANOX L06 | Mass % | 2.00 | 2.00 | 2.00 | 2.00 |
| | Active ingredient amount naphthylamine (antioxidant) | Mass % | 2.00 | 2.00 | 2.00 | 2.00 |
| Physical properties | NLGI penetration grade | — | | No. 2 to No. 3 | | |
| Performance | Rust-preventing property | — | A | A | A | A |
| | White layer flaking resistance | — | A | A | A | A |

TABLE 1-continued

|  | Items | Unit | Comparative Examples | | | |
|---|---|---|---|---|---|---|
|  |  |  | 1 | 2 | 3 | 4 |
| Thickener | Diurea (alicyclic diyrea: aliphatic diurea = 5:1) | Mass % | | | 15.50 | |
| Base oil | ADE | Mass % | 78.70 | 77.70 | 78.50 | 74.70 |
| Additives | Product name BRYTON C-400C | Mass % | 0.00 | 2.00 | 1.00 | 0.00 |
|  | Active ingredient amount calcium sulfonate (rust inhibitor A) | Mass % | 0.00 | 0.52 | 0.26 | 0.00 |
|  | Product name NA-SUL ZS-HT | Mass % | 1.00 | 0.00 | 1.00 | 1.00 |
|  | Active ingredient amount zinc sulfonate (rust inhibitor B) | Mass % | 0.35 | 0.00 | 0.35 | 0.35 |
|  | Product name DAILUBE Z-310 | Mass % | 0.80 | 0.80 | 0.00 | 0.80 |
|  | Active ingredient amount zinc carboxylate (rust inhibitor C) | Mass % | 0.16 | 0.16 | 0.00 | 0.16 |
|  | Product name LUBRIZOL 1395 | Mass % | 1.33 | 1.33 | 1.33 | 4.00 |
|  | Product name LUBRIZOL 677A | Mass % | 0.67 | 0.67 | 0.67 | 2.00 |
|  | Active ingredient amount ZnDTP (extreme pressure gent) | Mass % | 1.74 | 1.74 | 1.74 | 5.22 |
|  | Product name IRGANOX L06 | Mass % | 2.00 | 2.00 | 2.00 | 2.00 |
|  | Active ingredient amount naphthylamine (antioxidant) | Mass % | 2.00 | 2.00 | 2.00 | 2.00 |
| Physical properties | NLGI penetration grade | — | | No. 2 to No. 3 | | |
| Performance | Rust-preventing property | — | B | B | B | B |
|  | White layer flaking resistance | — | B | B | B | A |

|  | Items | Unit | Comparative Examples | | | |
|---|---|---|---|---|---|---|
|  |  |  | 5 | 6 | 7 | 8 |
| Thickener | Diurea (alicyclic diyrea: aliphatic diurea = 5:1) | Mass % | | | 15.50 | |
| Base oil | ADE | Mass % | 74.70 | 74.50 | 77.50 | 76.70 |
| Additives | Product name BRYTON C-400C | Mass % | 1.00 | 1.00 | 2.00 | 2.00 |
|  | Active ingredient amount calcium sulfonate (rust inhibitor A) | Mass % | 0.26 | 0.26 | 0.52 | 0.52 |
|  | Product name NA-SUL ZS-HT | Mass % | 0.00 | 1.00 | 0.00 | 1.00 |
|  | Active ingredient amount zinc sulfonate (rust inhibitor B) | Mass % | 0.00 | 0.35 | 0.00 | 0.35 |
|  | Product name DAILUBE Z-310 | Mass % | 0.80 | 0.00 | 0.00 | 0.80 |
|  | Active ingredient amount zinc carboxylate (rust inhibitor C) | Mass % | 0.16 | 0.00 | 0.00 | 0.16 |
|  | Product name LUBRIZOL 1395 | Mass % | 4.00 | 4.00 | 2.00 | 1.33 |
|  | Product name LUBRIZOL 677A | Mass % | 2.00 | 2.00 | 1.00 | 0.67 |
|  | Active ingredient amount ZnDTP (extreme pressure agent) | Mass % | 5.22 | 5.22 | 2.61 | 1.74 |
|  | Product name IRGANOX L06 | Mass % | 2.00 | 2.00 | 2.00 | 2.00 |
|  | Active ingredient amount naphthylamine (antioxidant) | Mass % | 2.00 | 2.00 | 2.00 | 2.00 |
| Physical properties | NLGI penetration grade | — | | No. 2 to No. 3 | | |
| Performance | Rust-preventing property | — | B | B | B | A |
|  | White layer flaking resistance | — | A | A | A | B |

The evaluation methods of the respective performances shown in Table 1 are as follows.

(Rust-Preventing Property)

Bearings of model number: 6202/1B2RM (two sealed deep groove ball bearings having bearing bore diameter of 15 mm in diameter, bearing outside diameter of 35 mm in diameter, and bearing width of 13 mm) in which a grease composition of 33 vol % of a space volume and 0.8 ml of 1 wt % salt water were enclosed were left to stand under an atmosphere of 40° C. for 120 hours in a state where central axes of the rolling bearings were aligned in a horizontal direction. Thereafter, the presence or absence of rust on raceways of an inner ring and an outer ring was visually checked. The results were shown in Table 1.

(Evaluation Criteria)

A: No rust on the raceways of the inner ring and the outer ring

B: One or both of the raceways of the inner ring and the outer ring have rust.

(White Layer Flaking Resistance) Bearings of model number: 62022RM (two sealed bearings of bearing designation 6202) were filled with each of the grease compositions prepared in Examples and Comparative Examples in a specified amount (35 vol % with respect to the volume of the space excluding the balls and the cage from the space surrounded by the inner ring, the outer ring, and the seal), and then the bearing filled with the grease composition was installed in a bearing rotation tester.

Thereafter, the inner ring of the bearing was rotated under the following conditions.

Temperature: room temperature
Radial load: 1.5 kN
Rotation speed: 9700 $\min^{-1} \Leftrightarrow 112000$ $\min^{-1}$
Acceleration time: 30 seconds
Deceleration time: 30 seconds
Time: 16 hours After the bearing rotation test, the thicknesses of reaction films that were derived from the extreme pressure agent and formed on the surfaces of the balls of the bearing were measured by an X-ray photoelectron spectroscopy (XPS) analyzer under the following conditions and evaluated according to the following criteria. The results were shown in Table 1.

As the X-ray photoelectron spectrometer, VersaProbe III manufactured by ULVAC-PHI, Inc was used.

(Measurement Conditions)
Sputtering gas: Ar+
Acceleration voltage: 2 kV
Sputtering area: 3×3
Sputtering rate: 2.32 nm/min ($SiO_2$)
Analysis diameter: 200 μm
Analysis cycle: 5 times
Measurement step: 0.125 eV
Pass energy: 140 eV (Evaluation Criteria)
A: The thickness of the reaction film is 5 nm or more.
B: The thickness of the reaction film is less than 5 nm.

As is clear from the results of Examples and Comparative Examples, by using the grease composition according to the embodiment of the present invention, the occurrence of white layer flaking can be prevented, and an excellent rust-preventing property can be imparted to the rolling bearing.

Therefore, regarding the rolling bearing in which with the grease composition is enclosed, white layer flaking is less likely to occur, and rust is less likely to occur.

The present application is based on Japanese Patent Application No. 2020-116496 filed on Jul. 6, 2020, the contents of which are incorporated herein as reference.

REFERENCE SIGNS LIST

1: Ball bearing
2: Inner ring
3: Outer ring
4: Ball
5: Cage
6: Seal
7: Region
G: Grease

The invention claimed is:

1. A grease composition comprising:
 a base oil;
 a thickener;
 a rust inhibitor; and
 an extreme pressure agent,
 wherein the rust inhibitor comprises, with respect to a total mass of the grease composition:
  0.10 mass % to 10.00 mass % of a calcium sulfonate;
  0.20 mass % to 10.00 mass % of a zinc sulfonate; and
  0.10 mass % to 10.00 mass % of a zinc carboxylate, and
 the extreme pressure agent comprises, with respect to the total mass of the grease composition,
  2.00 mass % to 14.00 mass % of a zinc dialkyldithiophosphate.

2. The grease composition according to claim 1, having a content of the calcium sulfonate of 0.30 mass % to 4.00 mass % with respect to the total mass of the grease composition.

3. The grease composition according to claim 1, having a total content of the rust inhibitor and the extreme pressure agent of 15.00 mass % or less with respect to the total mass of the grease composition.

4. The grease composition according to claim 1, further comprising an antioxidant,
 wherein the antioxidant comprises, with respect to the total mass of the grease composition,
  0.50 mass % to 5.00 mass % of naphthylamine.

5. A rolling bearing comprising:
 an inner ring;
 an outer ring;
 a plurality of rolling elements provided between the inner ring and the outer ring; and
 an annular cage,
 wherein the rolling bearing encloses a grease composition,
 the grease composition comprises:
  a base oil;
  a thickener;
  a rust inhibitor; and
  an extreme pressure agent,
 the rust inhibitor comprises, with respect to a total mass of the grease composition:
  0.10 mass % to 10.00 mass % of a calcium sulfonate;
  0.20 mass % to 10.00 mass % of a zinc sulfonate; and
  0.10 mass % to 10.00 mass % of a zinc carboxylate, and
 the extreme pressure agent comprises, with respect to the total mass of the grease composition, 2.00 mass % to 14.00 mass % of a zinc dialkyldithiophosphate.

6. The rolling bearing according to claim 5,
 wherein the grease composition has a content of the calcium sulfonate of 0.30 mass % to 4.00 mass % with respect to the total mass of the grease composition.

7. The rolling bearing according to claim 5,
 wherein the grease composition has a total content of the rust inhibitor and the extreme pressure agent of 15.00 mass % or less with respect to the total mass of the grease composition.

8. The rolling bearing according to claim 5,
 wherein the grease composition further comprises an antioxidant, and
 the antioxidant comprises, with respect to the total mass of the grease composition, 0.50 mass % to 5.00 mass % of naphthylamine.

9. The grease composition according to claim 1, having a content of the zinc sulfonate of 1.05 mass % to 10.00 mass % with respect to the total mass of the grease composition.

10. The grease composition according to claim 1, having a content of the calcium sulfonate of 0.52 mass % to 10.00 mass % and a content of the zinc sulfonate of 0.50 mass % to 10.00 mass %, both with respect to the total mass of the grease composition.

11. The grease composition according to claim 1, having a content of the calcium sulfonate of 0.30 mass % to 4.00 mass %, a content of the zinc sulfonate of 0.50 mass % to 3.00 mass %, and a content of the zinc carboxylate of 0.10 mass % to 1.00 mass %, all with respect to the total mass of the grease composition.

* * * * *